US012799920B2

(12) United States Patent
Wei et al.

(10) Patent No.: US 12,799,920 B2
(45) Date of Patent: Nov. 17, 2026

(54) METHOD FOR DETERMINING VORTEX-INDUCED RESONANCE REGION OF WIND TURBINE BLADE AND ANTI-VORTEX DEVICE

(71) Applicant: Envision Energy Co., Ltd., Jiangsu (CN)

(72) Inventors: Jiali Wei, Jiangsu (CN); Zhen Pan, Jiangsu (CN); Weiliang Chen, Jiangsu (CN); Bin Xu, Jiangsu (CN); Chaolun Wang, Jiangsu (CN)

(73) Assignee: Envision Energy Co., Ltd., Jiangsu (CN)

( * ) Notice: Subject to any disclaimer, the term of this patent is extended or adjusted under 35 U.S.C. 154(b) by 0 days.

(21) Appl. No.: 19/218,543

(22) Filed: May 26, 2025

(65) Prior Publication Data

US 2026/0132766 A1 May 14, 2026

Related U.S. Application Data

(63) Continuation of application No. PCT/CN2024/131846, filed on Nov. 13, 2024.

(51) Int. Cl.
*F03D 1/06* (2006.01)
*G01H 13/00* (2006.01)

(52) U.S. Cl.
CPC ......... *F03D 1/06495* (2023.08); *G01H 13/00* (2013.01); *F05B 2240/306* (2020.08)

(58) Field of Classification Search
CPC ....... F05B 2240/306; F05B 2240/3062; G01H 13/00; F03D 1/06495
See application file for complete search history.

(56) References Cited

U.S. PATENT DOCUMENTS

2015/0204306 A1* 7/2015 Herr ...................... F03D 7/0232 416/23
2021/0079896 A1 3/2021 Herrig et al.
(Continued)

FOREIGN PATENT DOCUMENTS

CN 205744309 U 11/2016
CN 210152837 U 3/2020
(Continued)

OTHER PUBLICATIONS

Envision Energy Co., Ltd., International Search Report with English Translation, PCT/CN2024/131846, Apr. 28, 2025, 8 pgs.
(Continued)

*Primary Examiner* — Michael K. Reitz
(74) *Attorney, Agent, or Firm* — USCH Law, PC

(57) ABSTRACT

A method for determining a vortex-induced resonance region of a wind turbine blade and an anti-vortex device are provided, and relates to the technical field of wind power equipment. The method includes: obtaining the natural frequency of the wind turbine blade; segmenting the wind turbine blade to obtain a plurality of blade sections; calculating a vortex shedding frequency of a cross section of each of the plurality of blade sections at different wind speeds or under different operating conditions; and determining at least one vortex-induced resonance region of the wind turbine blade by comparing the vortex shedding frequency of the cross section of each of the plurality of blade sections at different wind speeds or under different operating conditions with the natural frequency.

6 Claims, 7 Drawing Sheets

(56) References Cited

U.S. PATENT DOCUMENTS

| | | | | |
|---|---|---|---|---|
| 2022/0356865 | A1* | 11/2022 | Buhl | F03D 1/0633 |
| 2023/0104837 | A1 | 4/2023 | Danielsen et al. | |
| 2023/0106043 | A1 | 4/2023 | Danielsen et al. | |
| 2023/0287863 | A1* | 9/2023 | Herrig | F03D 1/0675 |
| 2024/0026855 | A1 | 1/2024 | El-Naaman et al. | |
| 2024/0084785 | A1* | 3/2024 | Schuon | F03D 13/10 |
| 2024/0360812 | A1 | 10/2024 | Canal Vila et al. | |

FOREIGN PATENT DOCUMENTS

| | | | |
|---|---|---|---|
| CN | 114676655 | A | 6/2022 |
| CN | 117552924 | A | 2/2024 |
| WO | 2024121147 | A1 | 6/2024 |

OTHER PUBLICATIONS

Envision Energy Co., Ltd., the European search report, EP24883616.5, Jan. 28, 2026, 5 pgs.

* cited by examiner

METHOD FOR DETERMINING VORTEX-INDUCED RESONANCE REGION OF WIND TURBINE BLADE AND ANTI-VORTEX DEVICE

CROSS REFERENCE TO RELATED APPLICATIONS

The present application is a continuation of PCT Patent Application No. PCT/CN2024/131846, filed Nov. 13, 2024, which is incorporated by reference herein in its entirety.

TECHNICAL FIELD

The various embodiments described in this document relate in general to the technical field of wind power equipment, and more specifically to a method for determining a vortex-induced resonance region of a wind turbine blade and an anti-vortex device.

BACKGROUND

With the development of wind power technology and equipment, users' requirements for the efficiency, safety, and service life of wind turbines are gradually improved. The blades of wind turbines may produce periodic vibration due to fluid dynamic effects at specific wind speeds. This kind of vibration is generally caused by that vortices form around the blade as the blade moves through the flowing air, and when the frequency of the vortex shedding matches the natural frequency of the blade, resonance occurs, resulting in significant vibration of the blade. In the related technologies, in order to suppress this vibration, an anti-vortex device is provided on the blade of the wind turbine. If the anti-vortex device is accurately installed in a vortex-induced resonance region, the anti-vortex vibration effect can be achieved. However, if the anti-vortex device is not installed in the vortex-induced resonance region, it will result in an ineffective arrangement, and the anti-vortex vibration effect may not be achieved. Therefore, the installation position of the anti-vortex device is important, and there is a need to design a method that can accurately determine the vortex-induced resonance region to effectively arrange the anti-vortex device.

SUMMARY

An object of the disclosure is to provide a method for determining a vortex-induced resonance region of a wind turbine blade, and to solve the technical problem that the ineffective arrangement of an anti-vortex device affects the anti-vortex vibration effect in the related technologies.

It is a further object of the present disclosure to enable a more accurate determination of the vortex-induced vibration region.

Another object of the present disclosure is to provide an anti-vortex device to improve the anti-vortex vibration effect.

In particular, the disclosure provides a method for determining a vortex-induced resonance region of a wind turbine blade. The method includes: obtaining a natural frequency of the wind turbine blade; calculating a vortex shedding frequency of a cross section of each of a plurality of blade sections of the wind turbine blade at different wind speeds or under different operating conditions; and determining at least one vortex-induced resonance region of the wind turbine blade by comparing the vortex shedding frequency of the cross section of each of the plurality of blade sections at different wind speeds or under different operating conditions with the natural frequency.

In some embodiments, calculating the vortex shedding frequency of the cross section of each of the plurality of blade sections of the wind turbine blade at different wind speeds or under different operating conditions includes: obtaining information related to a wind speed; and for each respective blade section of the plurality of blade sections, obtaining a chord length of an airfoil cross-section of the respective blade section; and calculating a vortex shedding frequency of the cross section of the respective blade section at different wind speeds according to the information related to the wind speed and the chord length of the airfoil cross-section of the respective blade section.

In some embodiments, the vortex shedding frequency of the cross section of the respective blade section at different wind speeds is calculated according to a following formula:

$$Sr = fD/U \qquad \text{formula (1)}$$

where Sr represents a Strouhal number, f represents the vortex shedding frequency, D represents the chord length of the airfoil cross-sectional of the respective blade section, and U represents the wind speed.

In some embodiments, calculating the vortex shedding frequency of the cross section of each of the plurality of blade sections at different wind speeds or under different operating conditions includes: for each respective blade section of the plurality of blade sections, performing simulating on the cross section of the respective blade section at different angles of attack and different wind speeds to obtain a modified Strouhal number for the cross section of the respective blade section under different operating conditions, and to determine a distance between free streamlines in a wake formed by airflow flowing through the cross section of the respective blade section and a free flow velocity at a flow separation point on the cross section of the respective blade section; and calculating the vortex shedding frequency of the cross section of the respective blade section under different operating conditions according to the modified Strouhal number, the distance between the free streamlines in the wake formed by the airflow flowing through the cross section of the respective blade section, and the free flow velocity at the flow separation point on the cross section of the respective blade section.

In some embodiments, the vortex shedding frequency of the cross section of the respective blade section under different operating conditions is calculated according to a following formula:

$$\text{Universal } Sr = f\ D'/Us \qquad \text{formula (2)}$$

where Universal Sr represents the modified Strouhal number, f represents the vortex shedding frequency, Us represents the free flow velocity at the flow separation point on the cross section of the respective blade section, and D' represents the distance between the free streamlines in the wake formed by the airflow flowing through the cross section of the respective blade section.

In some embodiments, calculating the vortex shedding frequency of the cross section of each of the plurality of blade sections at different wind speeds or under different operating conditions includes: constructing a target model; and inputting the cross section of each of the plurality of blade sections into the target model to obtain a vortex shedding frequency of the cross section of each of the plurality of blade sections under different operating conditions.

In some embodiments, inputting the cross section of each of the plurality of blade sections into the target model to obtain the vortex shedding frequency of the cross section of each of the plurality of blade sections under different operating conditions includes: inputting a geometric model of the wind turbine blade into the target model to determine a computational domain and a boundary condition; performing mesh division and parameter setting on the computational domain; simulating a motion of the wind turbine blade in a flow field using dynamic mesh technology and by programming a user-defined function (UDF) program; performing vortex-induced vibration simulation on the wind turbine blade at different wind speeds and different angles of attack; and extracting simulation results and performing calculating and analyzing on the simulation results to obtain the vortex shedding frequency of the cross section of each of the plurality of blade sections under different operating conditions.

In some embodiments, the method further includes following: after determining the at least one vortex-induced resonance region of the wind turbine blade by comparing the vortex shedding frequency of the cross section of each of the at least one blade section at different wind speeds or under different operating conditions with the natural frequency, obtaining a vibration mode amplitude, a frequency and a wind speed corresponding to each of vortex-induced resonance regions; and determining a final vortex-induced resonance region of the wind turbine blade according to the vibration mode amplitude, the frequency, and the wind speed corresponding to each of the at least one vortex-induced resonance region.

In some embodiments, the natural frequency of the wind turbine blade includes a first-order natural frequency and a second-order natural frequency.

Embodiments of the disclosure provide a computer device, including a memory, a processor, and a machine-executable program stored on the memory and running on the processor, where the machine-executable program, when executed by the processor, causes the processor to perform the method described above.

Embodiments of the disclosure provide an anti-vortex device for a wind turbine blade. The anti-vortex device is disposed in a vortex-induced resonance region of the wind turbine blade, and the anti-vortex device includes: at least one set of inclined flow disturbance blocks, where each of the at least one set of inclined flow disturbance blocks includes at least one first inclined flow disturbance block disposed at a leading edge of the wind turbine blade and at least one second inclined flow disturbance block disposed at a trailing edge of the wind turbine blade, and the at least one first inclined flow disturbance block and the at least one second inclined flow disturbance block are inclined and extend out of the wind turbine blade; and at least one set of spanwise flow disturbance strips, where each of the at least one set of spanwise flow disturbance strips includes at least one first spanwise flow disturbance strip disposed at the leading edge of the wind turbine blade and at least one second spanwise flow disturbance strip disposed at the trailing edge of the wind turbine blade, and the at least one first spanwise flow disturbance strip and the at least one second spanwise flow disturbance strip are arranged in an extension direction of the wind turbine blade.

In some embodiments, the at least one set of inclined flow disturbance blocks is embodied as a plurality of sets of inclined flow disturbance blocks, the at least one set of spanwise flow disturbance strips is embodied as a plurality of sets of spanwise flow disturbance strips, and the plurality of sets of inclined flow disturbance blocks and the plurality of sets of spanwise flow disturbance strips are arranged and staggered in the extension direction of the wind turbine blade.

In some embodiments, the at least one first inclined flow disturbance block and the at least one second inclined flow disturbance block in each of the plurality of sets of inclined flow disturbance blocks are inclined toward a blade tip direction of the wind turbine blade or inclined toward a blade root direction of the wind turbine blade.

In some embodiments, in the plurality of sets of inclined flow disturbance blocks, first inclined flow disturbance blocks are inclined in a same direction, and second inclined flow disturbance blocks are inclined in a same direction.

In some embodiments, for two sets of adjacent inclined flow disturbance blocks of the plurality of sets of inclined flow disturbance blocks, first inclined flow disturbance blocks are inclined in opposite directions and second inclined flow disturbance blocks are inclined in opposite directions.

In some embodiments, in each of the plurality of sets of inclined flow disturbance blocks, the at least one first inclined flow disturbance block is disposed on a pressure side or a suction side of the wind turbine blade, and the at least one second inclined flow disturbance block is disposed on a side opposite to the at least one first inclined flow disturbance block.

In some embodiments, in the plurality of sets of inclined flow disturbance blocks, first inclined flow disturbance blocks are arranged on the pressure side or the suction side of the wind turbine blade.

In some embodiments, in each of the plurality of sets of spanwise flow disturbance strips, the at least one first spanwise flow disturbance strip is disposed on a pressure side or a suction side of the wind turbine blade, and the at least one second spanwise flow disturbance strip is disposed on a side opposite to the at least one first spanwise flow disturbance strip.

In some embodiments, two sets of first spanwise flow disturbance strips of the two sets of adjacent spanwise flow disturbance strips of the plurality of sets of spanwise flow disturbance strips are arranged on the pressure side and the suction side of the wind turbine blade, respectively.

In some embodiments, the at least one first spanwise flow disturbance strip and the at least one second spanwise flow disturbance strip in each of the plurality of sets of spanwise flow disturbance strips are extended out of the wind turbine blade.

In the method of the disclosure, the natural frequency of the wind turbine blade is obtained, the wind turbine blade is segmented to obtain a plurality of blade sections, a vortex shedding frequency of a cross section of each of the plurality of blade sections at different wind speeds or under different operating conditions is calculated; and the vortex-induced resonance region of the wind turbine blade is determine by comparing the vortex shedding frequency of the cross section of each of the plurality of blade sections at different wind speeds or under different operating conditions with the natural frequency. The above technical solution clarifies the main energy input region where vortex-induced vibration phenomenon occurs in the wind turbine blade, that is, the vortex-induced vibration region, so that the anti-vortex device is installed in the vortex-induced vibration region, thereby improving the effectiveness of the anti-vortex measures, reducing the ineffective arrangement of the anti-vortex device, and saving the cost.

Furthermore, for each respective blade section of the plurality of blade sections, simulating is performed on the cross section of the respective blade section at different angles of attack and different wind speeds to obtain a modified Strouhal number for the cross section of the respective blade section under different operating conditions, and to determine a distance between free streamlines in a wake formed by airflow flowing through the cross section of the respective blade section and a free flow velocity at a flow separation point on the cross section of the respective blade section. The vortex shedding frequency of the cross section of the respective blade section under different operating conditions is calculated according to the modified Strouhal number, the distance between the free streamlines in the wake formed by the airflow flowing through the cross section of the respective blade section, and the free flow velocity at the flow separation point on the cross section of the respective blade section. The aforementioned technical solution fully takes into account the cross-sectional shapes of different blade sections and the impact of the cross-sectional shapes of different blade sections on the Strouhal number at various angles of attack and wind speeds. By utilizing two-dimensional numerical simulations, the cross-sectional shapes of different blade segments are simulated and calculated at different angles of attack and wind speeds to obtain a modified Strouhal number under different operating conditions, thereby enabling more accurate calculation of the vortex shedding frequency and more precise identification of the vortex-induced vibration region.

The above and other objects, advantages and features of the present disclosure will become more apparent to those skilled in the art from the following detailed description of specific embodiments of the disclosure taken in conjunction with the accompanying drawings.

BRIEF DESCRIPTION OF THE DRAWINGS

Some specific embodiments of the present disclosure will be described in detail hereinafter by way of example and not limitation with reference to the accompanying drawings. Like reference numerals in the drawings designate the same or similar parts or parts. It shall be understood by those skilled in the art that these drawings are not drawn to scale.

Figure 1:
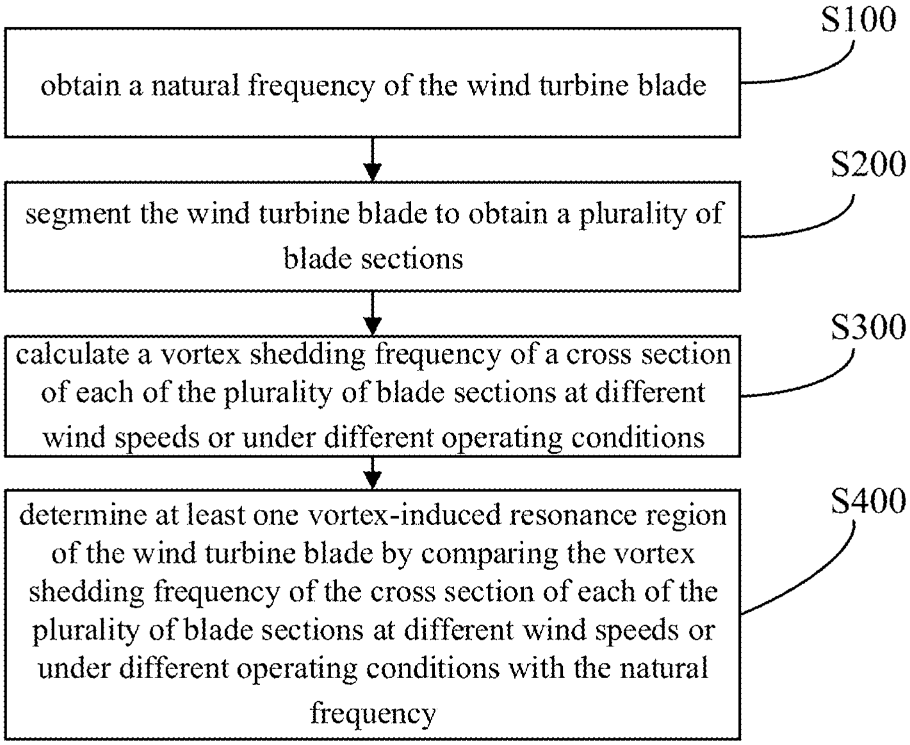
FIG. 1 is a schematic flow chart of a method for determining a vortex-induced resonance region of a wind turbine blade according to embodiments of the present disclosure.

Reference numerals are as follows: 100—computer device, 110—processor, 120—memory, 130—machine-executable program, 200—wind turbine blade, 300—anti-vortex device, 310—set of inclined flow disturbance blocks, 320—set of spanwise flow disturbance strips, 311—first inclined flow disturbance block, 312—second inclined flow disturbance block, 321—first spanwise flow disturbance strip, 322—second spanwise flow disturbance strip.

DETAILED DESCRIPTION OF THE EMBODIMENTS

Embodiments of the present disclosure are described in detail below, examples of which are shown in the accompanying drawings, where identical or similar reference numerals denote identical or similar elements or elements having identical or similar functions throughout. The embodiments described below with reference to the accompanying drawings are exemplary and are intended to be used to explain the disclosure, and are not intended to limit the disclosure.

In the description of this embodiment, it shall be understood that the orientation or positional relationship indicated by the terms "left", "right" and the like is based on the orientation or positional relationship shown in the accompanying drawings, and is only for the convenience of describing and simplifying the description of the present disclosure, which does not indicate or imply that the referred device or element must have a specific orientation, be constructed and operate in a specific orientation, and therefore cannot be understood as a limitation of the present disclosure.

The terms "first" and "second" are for descriptive purposes only and are not to be understood as indicating or implicitly indicating relative importance or as implicitly indicating the number of technical features indicated. Thus, a feature defined as "first" or "second" may explicitly or implicitly include at least one of the features, i.e., include one or more of the features. In the description of the present disclosure, "a plurality" means at least two, for example, two, three, etc., unless otherwise specifically defined. When a certain feature "includes/comprises or contains" a certain or certain of its encompassed features, unless specifically described otherwise, this indicates that other features are not excluded and may be further included.

Unless otherwise expressly specified and defined, terms such as "connected/connection" and "mounted" are to be understood broadly, for example, they may indicate fixed connections, detachable connections, or integrally formed connections. They may be mechanical or electrical connections. They can be directly connections, or indirectly connections through an intermediate medium, and they can be the internal communication of two elements or the interaction of two elements, unless otherwise explicitly defined. Those skilled in the art should be able to understand the specific meanings of the above terms in the present disclosure according to the specific circumstances.

Unless otherwise defined, all terms (including technical terms and scientific terms) used in the description of the embodiments have the same meaning as commonly understood by one of ordinary skill in the art to which this application belongs.

FIG. 1 is a schematic flow chart of a method for determining a vortex-induced resonance region of a wind turbine blade according to embodiments of the present disclosure. As shown in FIG. 1, in one embodiment, the method begins at S100.

At S100, a natural frequency of a wind turbine blade is obtained.

At S200, the wind turbine blade is segmented to obtain a plurality of blade sections.

At S300, a vortex shedding frequency of a cross section of each of the plurality of blade sections at different wind speeds or under different operating conditions is calculated.

At S400, the vortex shedding frequency of the cross section of each of the plurality of blade sections at different wind speeds or under operating conditions is compared with the natural frequency to determine at least one vortex-induced resonance region of the wind turbine blade.

This embodiment clarifies the main energy input region where the vortex-induced vibration phenomenon occurs in the wind turbine blade, that is, the vortex-induced vibration/resonance region, so that the anti-vortex device is installed in the vortex-induced vibration region, thereby improving the effectiveness of the anti-vortex measures, reducing the ineffective arrangement of the anti-vortex devices, and saving the cost.

In operations at S100, the natural frequency of the wind turbine blade includes a first-order natural frequency and a second-order natural frequency. A vibration mode of the wind turbine blade can be obtained while the natural frequency of the wind turbine blade is obtained. It shall be understood that the vortex shedding frequency finally obtained in this embodiment needs to be compared with the first-order natural frequency and the second-order natural frequency respectively, which allows for the determination of vortex-induced vibration regions at different-orders natural frequencies.

It shall be noted that the "vibration mode" of the wind turbine blade refers to the form or pattern of the wind turbine blade during vibration, that is, the vibration shape of the blade at different natural frequencies. That is to say, the vibration mode (or mode shape) is the spatial form of the structure's vibration at a certain natural frequency, describing the relative displacement distribution of different parts of the structure.

In operations at S200, the wind turbine blade can be segmented at equal intervals. In other embodiments, the wind turbine blade may also be segmented according to other segmentation rules.

Figure 2:
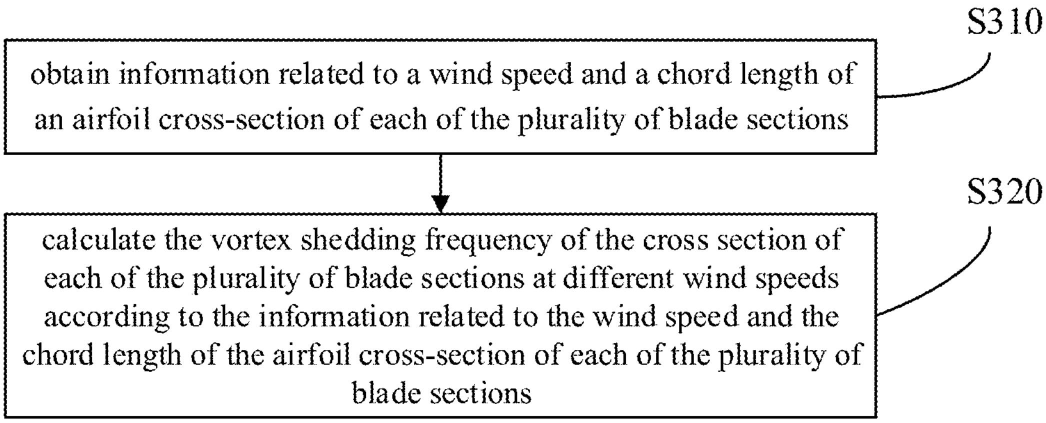
FIG. 2 is a schematic flow chart of a method for determining a vortex-induced resonance region of a wind turbine blade according to other embodiments of the present disclosure.

FIG. 2 is a schematic flow chart of a method for determining a vortex-induced resonance region of a wind turbine blade according to other embodiments of the present disclosure. As shown in FIG. 2, in some embodiments, operations at S300 can be implemented as follows.

At S310, information related to a wind speed and a chord length of an airfoil cross-section of each of the plurality of blade sections are obtained.

At S320, the vortex shedding frequency of the cross section of each of the plurality of blade sections at different wind speeds is calculated according to the information related to the wind speed and the chord length of the airfoil cross-section of each of the plurality of blade sections.

In embodiments of the disclosure, a classical definition method is used to calculate the vortex shedding frequency. When the fluid flows through the structure immersed therein, flow separation occurs, and a series of regularly arranged vortices are generated behind the structure. Specifically, the vortex shedding frequency of the cross section of each of the plurality of blade sections at different wind speeds is calculated according to a following formula:

$$Sr = f * D/U \qquad \text{formula (1)}$$

where Sr denotes a Strouhal number, f denotes the vortex shedding frequency, D denotes the chord length of the airfoil cross-section of each of the plurality of blade sections, U denotes a wind speed, and * represents the multiplication sign.

Here, the Strouhal number is a dimensionless parameter, which is related to the cross-sectional shape of the structure and Reynolds number. Here, Sr is simply considered as the Strouhal number (Sr) for a circular cross section, and Sr is regarded as a constant within a current range of the Reynolds number. The wind speed specifically refers to a mean wind speed of an incoming flow. Because the Sr for the wind turbine blade is simplified, it is necessary to safely amplify the vortex-induced vibration region after determining the vortex-induced vibration region by using this method. Formula (1) can be regarded as a first method for determining the vortex-induced vibration region.

Figure 3:
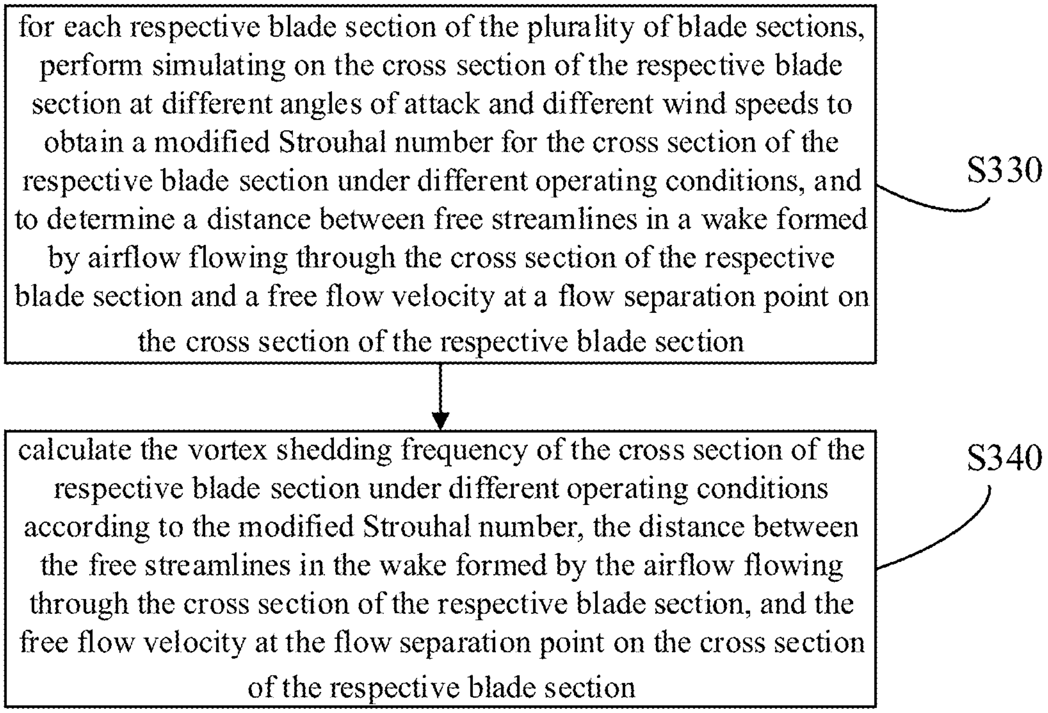
FIG. 3 is a schematic flow chart of a method for determining a vortex-induced resonance region of a wind turbine blade according to other embodiments of the present disclosure.

FIG. 3 is a schematic flow chart of a method for determining a vortex-induced resonance region of a wind turbine blade according to other embodiments of the present disclosure. As shown in FIG. 3, in some embodiments, operations at S300 can be implemented as follows.

At S330, for each respective blade section of the plurality of blade sections, simulating is performed on the cross section of the respective blade section at different angles of attack and different wind speeds to obtain a modified Strouhal number for the cross section of the respective blade section under different operating conditions, and to determine a distance between free streamlines in a wake formed by the airflow flowing through the cross section of the respective blade section and a free flow velocity at a flow separation point on the cross section of the respective blade section.

At S340, the vortex shedding frequency of the cross section of the respective blade section under different operating conditions is calculated according to the modified Strouhal number, the distance between the free streamlines in the wake formed by the airflow flowing through the cross section of the respective blade section, and the free flow velocity at the flow separation point on the cross section of the respective blade section.

Specifically, the vortex shedding frequency of the cross section of each of the plurality of blade sections under different operating conditions is calculated according to a following formula:

$$\text{Universal } Sr = f * D'/Us \qquad \text{formula (2)}$$

where Universal Sr represents the modified Strouhal number, f represents the vortex shedding frequency, Us represents the free flow velocity at the flow separation point on the cross section of the respective blade section, D' represents the distance between free streamlines in the wake formed by the airflow flowing through the cross section of the respective blade section, and * represents the multiplication sign.

In the above formula (1), a cross-sectional shape of each of different blade sections and their influence on the Strouhal number at different angles of attack and wind speeds are ignored. In formula (2), the cross-sectional shape of each of different blade sections and their influence on the Strauhar number at different angles of attack and wind speeds are fully considered. With aid of two-dimensional numerical simulation, two-dimensional numerical simulation is performed for the cross-sectional shape of each of different blade sections at different angles of attack and wind speeds, and the modified Strauhar number under different operating conditions is obtained, so that the vortex shedding frequency can be calculated more accurately and the vortex-induced vibration region can be determined more accurately. Here, this embodiment is equivalent to adopting a semi-theoretical semi-empirical mathematical model correction method, and formula (2) can be regarded as a second method for determining the vortex-induced vibration region.

Figure 4:
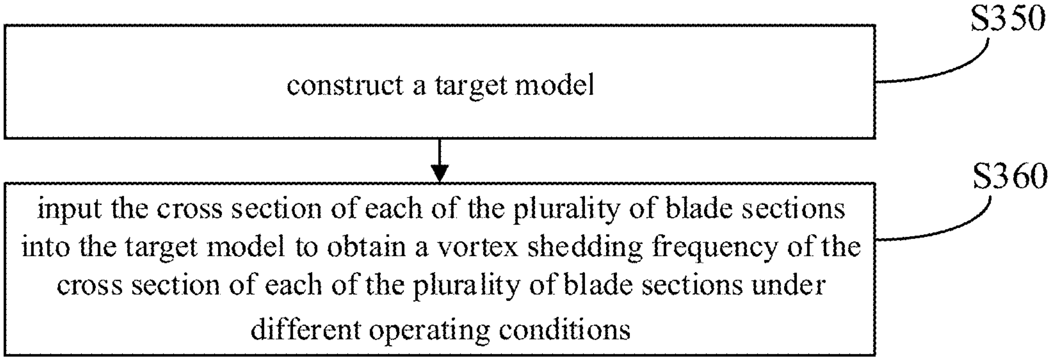
FIG. 4 is a schematic flow chart of a method for determining a vortex-induced resonance region of a wind turbine blade according to other embodiments of the present disclosure.

FIG. 4 is a schematic flow chart of a method for determining a vortex-induced resonance region of a wind turbine blade according to other embodiments of the present disclosure. As shown in FIG. 4, in some embodiments, the operations at S300 of calculating the vortex shedding frequency of the cross section of each of the plurality of blade sections at different wind speeds or under different operating conditions can be implemented as follows.

At S350, a target model is constructed.

At S360, the cross section of each of the plurality of blade sections is input into the target model to obtain a vortex shedding frequency of the cross section of each of the plurality of blade sections under different operating conditions.

Figure 5:
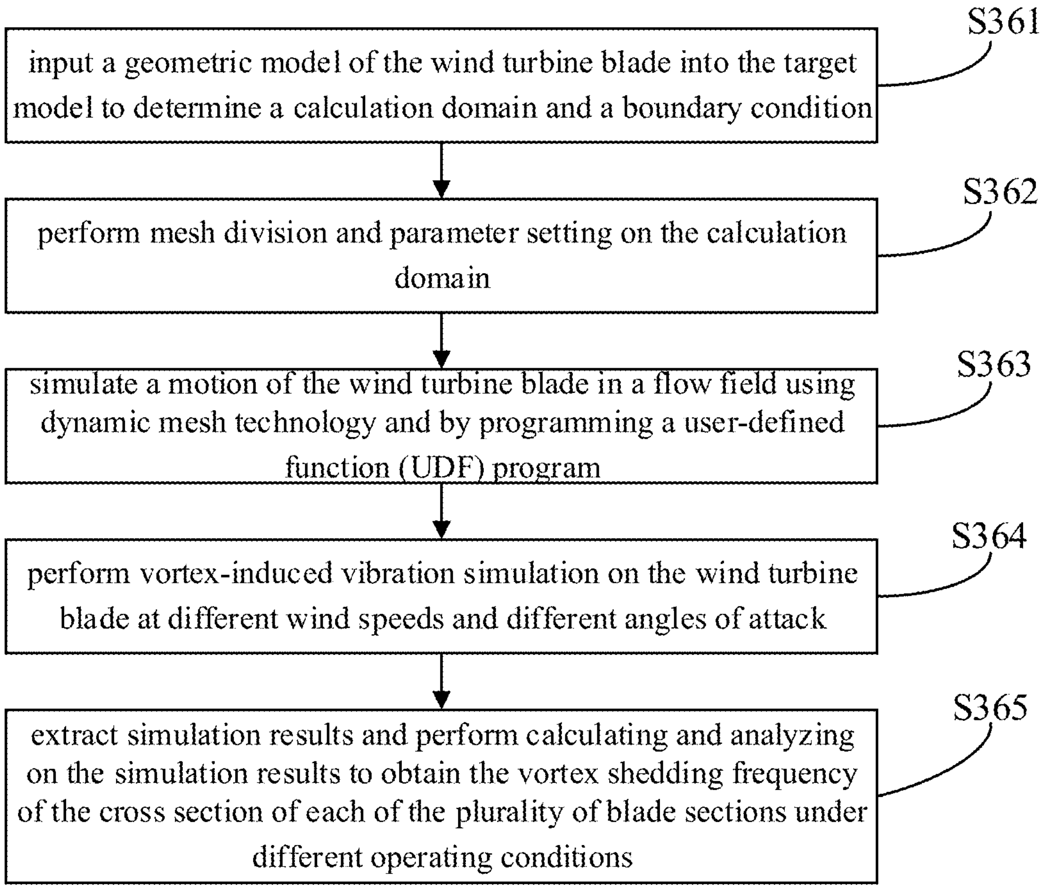
FIG. 5 is a schematic flow chart of a method for determining a vortex-induced resonance region of a wind turbine blade according to other embodiments of the present disclosure.

FIG. 5 is a schematic flow chart of a method for determining a vortex-induced resonance region of a wind turbine blade according to other embodiments of the present disclosure. As shown in FIG. 5, operations at S360 can be implemented as follows.

At S361, a geometric model of the wind turbine blade is input into the target model to determine a computational domain and a boundary condition.

It shall be noted that the computational domain refers to a region or spatial range used for numerical simulation. For the simulation of wind turbine blades, the computational domain generally includes the airflow region around the blades and may extend to the far field of the fan to ensure the accuracy of the simulation results. The boundary condition refers to a physical condition set on the boundaries of the computational domain, which are used to describe the behavior of the fluid or structure at the boundaries. For the simulation of the wind turbine blades, the boundary condition may include: an inlet boundary condition: defining the inlet velocity, pressure, or turbulence characteristics of the airflow; an outlet boundary condition: Defining the outlet pressure or velocity of the airflow; a wall boundary condition: defining the interaction between the blade surface and the fluid, such as the no-slip condition; and a far-field boundary condition: Defining the influence of the external environment of the computational domain, such as free-stream conditions.

At S362, mesh division and parameter setting are performed on the computational domain.

At S363, a motion of the wind turbine blade in a flow field is simulated using dynamic mesh technology and by programming a user-defined function (UDF) program.

At S364, vortex-induced vibration simulation is performed on the wind turbine blade at different wind speeds and different angles of attack.

At S365, simulation results are extracted and calculated and analyzed to obtain the vortex shedding frequency of the cross section of each of the plurality of blade sections under different operating conditions.

In the formula (2), the three-dimensional effect of the wake vortex formed by the airflow passing through the wind turbine blade is ignored, while this embodiment takes into account the three-dimensional effect of the wake vortex formed by the airflow passing through the wind turbine blade. In this embodiment, the vortex shedding frequency is obtained by calculating through the three-dimensional model, so that a more accurate vortex shedding frequency can be obtained. This calculation method can be regarded as a third method for determining the vortex-induced vibration region.

Figure 6:
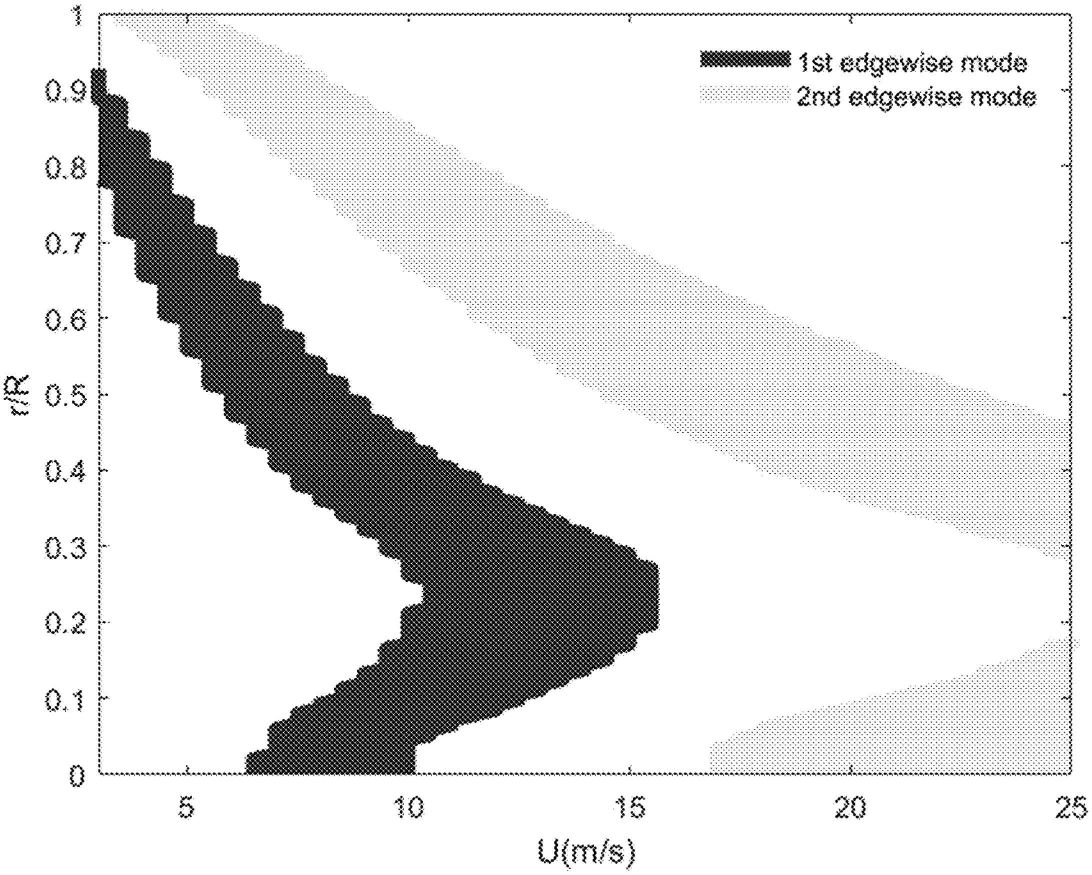
FIG. 6 is a schematic diagram of vortex-induced resonance regions exciting various orders of vortex-induced vibration phenomenon in a wind turbine blade according to embodiments of the present disclosure.

FIG. 6 is a schematic diagram of vortex-induced resonance region exciting various orders of vortex-induced vibration phenomenon in a wind turbine blade according to embodiments of the present disclosure. As shown in FIG. 6, in operations at S400, by comparing the vortex shedding frequency with the natural frequency, cross-sectional regions of the wind turbine blade where the vortex shedding frequency is close to each order of natural frequency of the wind turbine blade at different wind speeds or under different operating conditions are identified, and the cross-sectional regions are the vortex-induced vibration regions, that is, critical regions, that excite/trigger various orders of vortex-induced vibration phenomena in the wind turbine blade.

Figure 7:
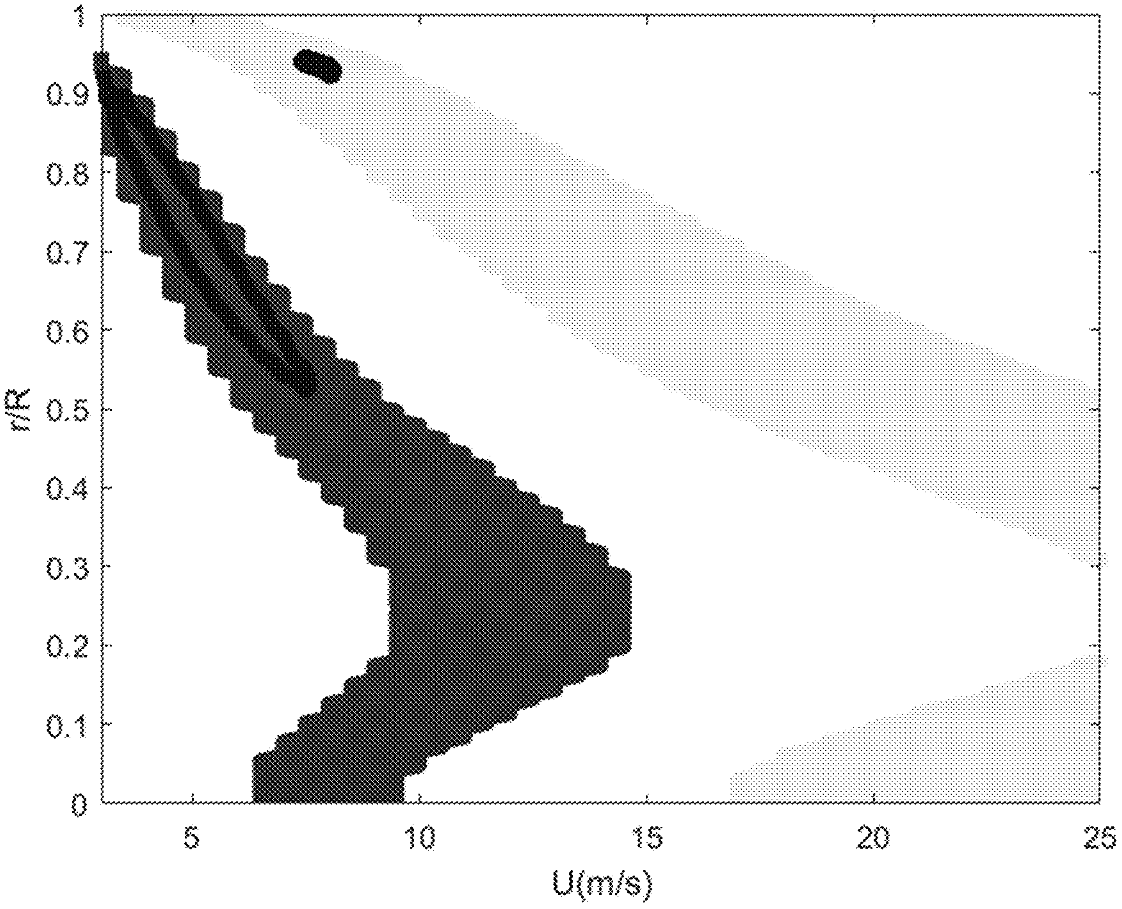
FIG. 7 is a schematic diagram of a final vortex-induced resonance region exciting various orders of vortex-induced vibration phenomenon in a wind turbine blade according to embodiments of the present disclosure.

FIG. 7 is a schematic diagram of a final vortex-induced resonance region exciting various orders of vortex-induced vibration phenomenon in a wind turbine blade according to embodiments of the present disclosure. As shown in FIG. 7, in some embodiments, after operations at S400, the method further includes the following.

At step 1, a vibration mode amplitude, a frequency, and a wind speed corresponding to each of vortex-induced vibration regions are obtained.

At step 2, a final vortex-induced resonance region of the wind turbine blade is determined according to the vibration mode amplitude, the frequency, and the wind speed corresponding to each of the vortex-induced vibration regions.

In this embodiment, for each of the various orders of vortex-induced vibration regions, relative energy contribution degree of the vortex-induced vibration region to the wind turbine blade is related to the vibration mode amplitude, the frequency, and the wind speed corresponding to the vortex-induced vibration region. By comprehensively analyzing the above parameters, the main energy input regions for vortex-induced vibration at different modal orders of the wind turbine blade can be determined, resulting in the final vortex-induced vibration/resonance region, i.e., the region circled in FIG. 7. Deploying the anti-vortex device in the circled region can enhance the effectiveness of vortex-induced vibration suppression.

When the airflow passes through the wind turbine blade, vortices that may be periodically shed/released alternatingly will be generated in the wake on both sides of the wind turbine blade, causing periodic changes on the surface of the wind turbine blade, thereby generating periodic vortex-induced forces on the wind turbine blade. When the wind speed increases to a specific value, the vortex shedding frequency is close to the natural frequency of the wind turbine blade, which may cause the wind turbine blade to produce vortex-induced resonance. In practical operations, vortex-induced vibration in the edgewise direction is prone to occur after blade transportation, hoisting, and before grid connection. Therefore, it is necessary to obtain the various orders of natural frequencies of the wind turbine blade.

When the vortex-induced resonance occurs in the wind turbine blade, an amplitude of vibration of the wind turbine blade may increase significantly, resulting in a violent interaction between the movement of the wind turbine blade and the airflow, that is, the aeroelastic effect. This aeroelastic effect will cause the vortex shedding frequency to be controlled by the natural frequency of the wind turbine blade. That is, even when changes in the wind speed cause the Strouhal frequency to deviate from the natural frequency of the wind turbine blade to a certain extent, the vortex shedding frequency will still be controlled and locked near the natural frequency of the wind turbine blade. In other words, when the vortex-induced frequency occurs in the wind turbine blade, the vortex-induced frequency may not change with the change of wind speed within a certain wind speed range. Therefore, the vortex-induced vibration region can be calculated by three calculation methods, and ultimately determining the primary energy input regions for vortex-induced vibration at different modal orders of the wind turbine blade, i.e., the final vortex-induced vibration region.

Figure 8:
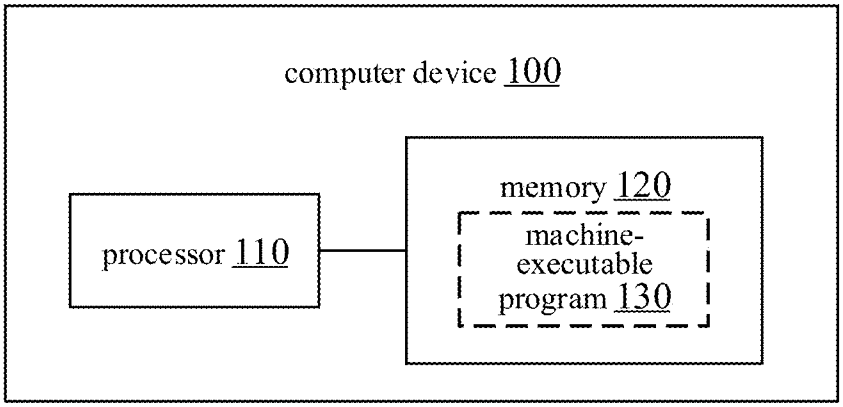
FIG. 8 is a schematic block diagram of a computer device according to embodiments of the present disclosure.

FIG. 8 is a schematic block diagram of a computer device 100 according to embodiments of the present disclosure. As shown in FIG. 8, embodiments of the disclosure further provide a computer device 100. The computer device 100 includes a memory 120, a processor 110, and a machine-executable program 130 stored in the memory 120 and running on the processor 110. The processor 110 is configured to implement the method in any of the above embodiments when the processor 110 executes the machine-executable program. The processor 110 may be a central processing unit (CPU), a digital processing unit, or the like. The processor 110 transmits and receives data through a communication interface. The memory 120 is configured to store the machine-executable program 130 executed by the processor 110. The memory 120 is any medium that can be used to carry or store a desired program code in the form of instructions or data structures and that can be accessed by a computer, or may be a combination of a plurality of memories 120. The above-described computing programs may be downloaded from a computer-readable storage medium to a respective computing/processing device or to a computer or an external storage device via a network, such as the Internet, a local area network, a wide area network, and/or a wireless network. Here, the memory 120 and the processor 110 may be integrated together or may be separately provided.

Figure 9:
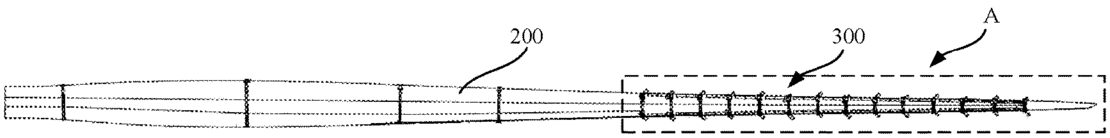
FIG. 9 is a schematic structural view of an anti-vortex device installed in a vortex-induced resonance region of a wind turbine blade according to embodiments of the present disclosure.
Figure 10:
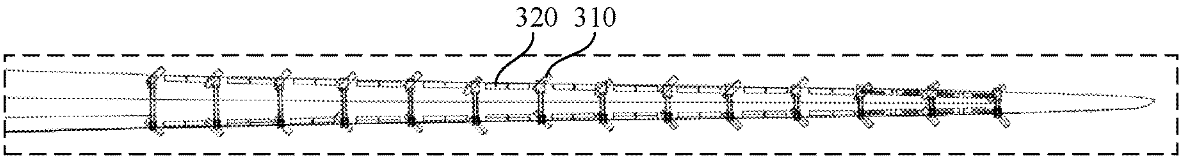
FIG. 10 is a schematic enlarged view of part A of FIG. 9.
Figure 11:
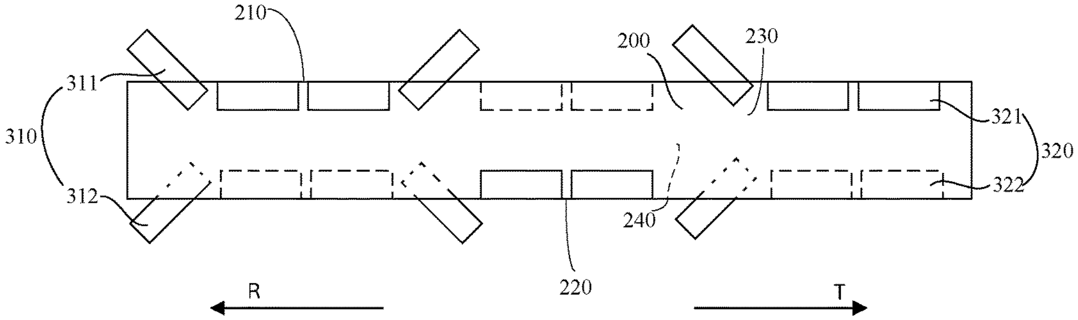
FIG. 11 is a schematic structural view of an anti-vortex device according to embodiments of the present disclosure.
Figure 12:
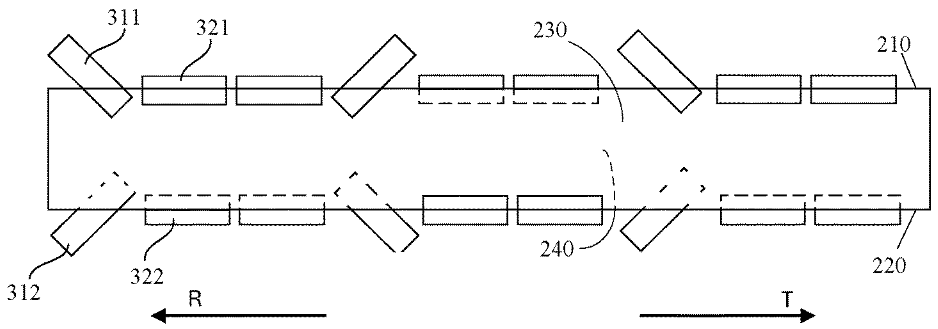
FIG. 12 is a schematic structural view of an anti-vortex device according to other embodiments of the present disclosure.
Figure 13:
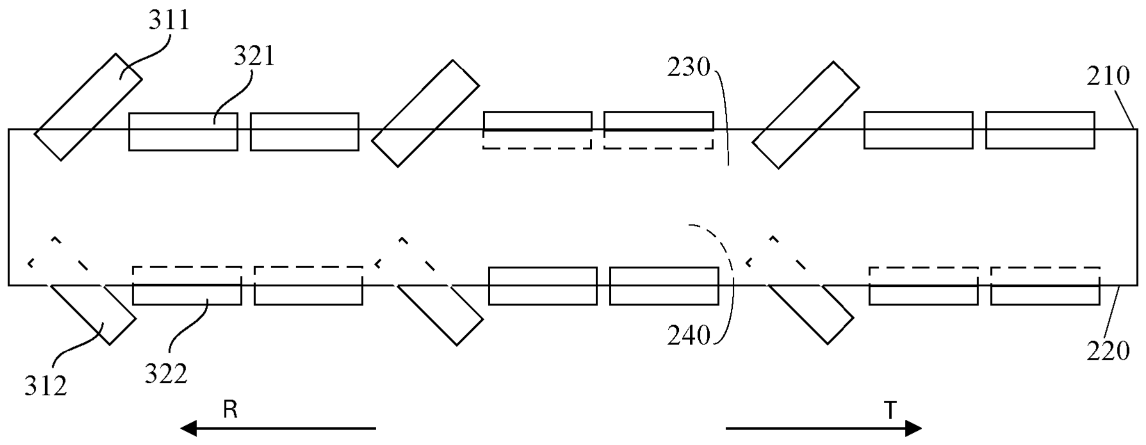
FIG. 13 is a schematic structural view of an anti-vortex device according to other embodiments of the present disclosure.
Figure 14:
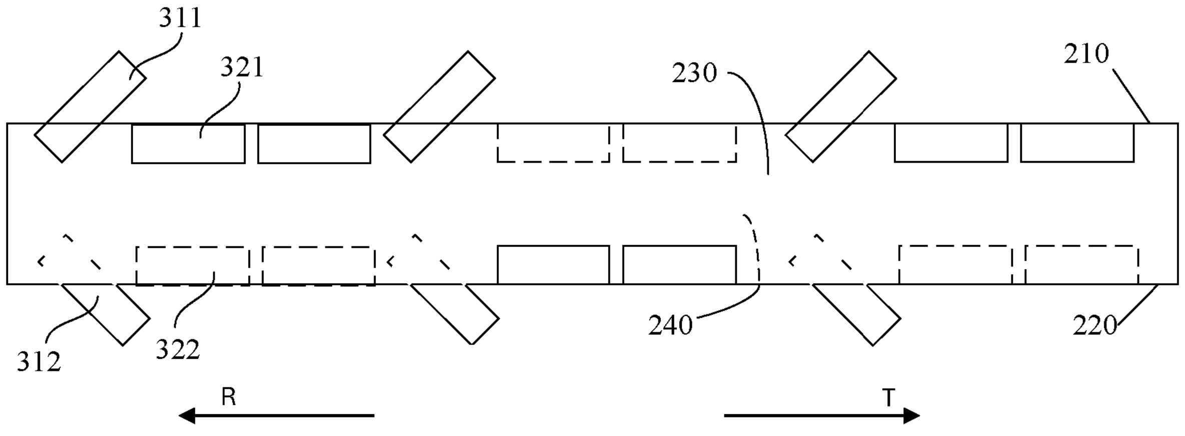
FIG. 14 is a schematic structural view of an anti-vortex device according to other embodiments of the present disclosure.

FIG. 9 is a schematic structural view of an anti-vortex device (or a device for vortex-induced resonance prevention) 300 installed in a vortex-induced resonance region of a wind turbine blade 200 according to embodiments of the present disclosure, FIG. 10 is a schematic enlarged view of part A of FIG. 9, FIG. 11 is a schematic structural view of an anti-vortex device 300 according to embodiments of the present disclosure, FIG. 12 is a schematic structural view of an anti-vortex device 300 according to other embodiments of the present disclosure, FIG. 13 is a schematic structural view of an anti-vortex device 300 according to other embodiments of the present disclosure, and FIG. 14 is a schematic structural view of an anti-vortex device 300 according to other embodiments of the present disclosure. As shown in FIGS. 9 to 14, in a specific embodiment, the anti-vortex device 300 of the wind turbine blade 200 is disposed in the vortex-induced resonance/vibration region of the wind turbine blade 200. The anti-vortex device 300 includes at least one set of inclined flow disturbance blocks 310 and at least one set of spanwise flow disturbance strips 320. Each of the at least one set of inclined flow disturbance blocks 310 includes at least one first inclined flow disturbance block 311 disposed at a leading edge 210 of the wind turbine blade 200 and at least one second inclined flow disturbance block 312 disposed at a trailing edge 220 of the wind turbine blade 200. The first inclined flow disturbance block 311 and the second inclined flow disturbance block 312 are both inclined and extend out of the wind turbine blade 200. Each of the at least one set of spanwise flow disturbance strips includes at least one first spanwise flow disturbance strip 321 disposed at the leading edge 210 of the wind turbine blade and at least one second spanwise flow disturbance strip 322 disposed at the trailing edge 220 of the wind turbine blade. The first spanwise flow disturbance strip 321 and the second spanwise flow disturbance strip 322 are arranged in an extension direction of the wind turbine blade 200. Here, the first inclined flow disturbance block 311, the second inclined flow disturbance block 312, the first spanwise flow disturbance strip 321, and the second spanwise flow disturbance strip 322 are all mounted on the wind turbine blade 200 using straps. In this way, the chord length of the wind turbine blade 200 can be changed, such that the vortex shedding frequency of the cross section of the wind turbine blade 200 can be changed, thereby affecting the energy input of vortex-induced vibration. The first inclined flow disturbance block 311 and the second inclined flow disturbance block 312 of each set of inclined flow disturbance blocks 310 may be understood to be in a same phase with the wind turbine blade 200. The first spanwise flow disturbance strip 321 and the second spanwise flow disturbance strip 322 of each set of spanwise flow disturbance strips 320 may be understood to be in a same phase with the wind turbine blade 200.

Referring to FIGS. 11 to 14, the at least one set of inclined flow disturbance blocks 310 is embodied as a plurality of sets of inclined flow disturbance blocks 310, and the at least one set of spanwise flow disturbance strips 320 is embodied as a plurality of sets of spanwise flow disturbance strips 320. The plurality of sets of inclined flow disturbance blocks 310 and the plurality of sets of spanwise flow disturbance strips 320 are arranged and staggered in the extension direction of the wind turbine blade 200. In this embodiment, the spanwise flow disturbance strips are densely arranged between two sets of adjacent inclined flow disturbance blocks 310, causing continuous disturbance to the external dimensions of the wind turbine blade 200 and disrupting the continuous energy input in the spanwise direction of the blade.

Referring to FIG. 11, the first inclined flow disturbance block 311 and the second inclined flow disturbance block 312 are both inclined and extend out of the wind turbine blade 200, and an inclination angle is determined according to specific design requirements. Preferably, the first inclined flow disturbance block 311 and the second inclined flow disturbance block 312 are arranged symmetrically in a center line of the wind turbine blade 200.

In some embodiments, the first inclined flow disturbance block 311 and the second inclined flow disturbance block 312 in each of the at least one set of inclined flow disturbance blocks 310 are both inclined toward a blade tip direction T of the wind turbine blade 200 or both inclined toward a blade root direction R of the wind turbine blade 200. Referring to FIG. 11, that is, the first inclined flow disturbance block 311 and the second inclined flow disturbance block 312 in each of the at least one set of inclined flow disturbance blocks 310 are inclined toward the left or toward the right of the wind turbine blade 200.

Referring to FIGS. 11 and 12, in some embodiments, for two sets of adjacent inclined flow disturbance blocks 310, the first inclined flow disturbance blocks 311 are inclined in opposite directions and the second inclined flow disturbance blocks 312 are inclined in opposite directions. Here, when the first inclined flow disturbance block 311 of one set of inclined flow disturbance blocks 310 is inclined toward the blade root direction R of the wind turbine blade 200, the first inclined flow disturbance block 311 of the other set of inclined flow disturbance blocks 310 is inclined toward the blade tip direction T of the wind turbine blade 200. If the second inclined flow disturbance block 311 of the one set of inclined flow disturbance blocks 310 is inclined toward the direction R of the wind turbine blade 200, the second inclined flow disturbance block 312 of the other set of inclined flow disturbance blocks 310 is inclined toward the blade tip direction T of the wind turbine blade 200. The first inclined flow disturbance block 311 and the second inclined flow disturbance block 312 in each set of inclined flow disturbance blocks 310 are inclined in a same direction.

Referring to FIGS. 13 and 14, in some embodiments, in the plurality of sets of inclined flow disturbance blocks 310, first inclined flow disturbance blocks 311 are inclined in a same direction and second inclined flow disturbance blocks 312 are inclined in a same direction.

Referring to FIGS. 11 to 14, in each set of inclined flow disturbance blocks 310, the first inclined flow disturbance block 311 is disposed on a pressure side 230 or a suction side 240 of the wind turbine blade 200, and the second inclined flow disturbance block 312 is disposed on a side opposite to the first inclined flow disturbance block 311. For example, in each set of inclined flow disturbance blocks 310, the first inclined flow disturbance block 311 is disposed on the pressure side 230 of the wind turbine blade 200, and the second inclined flow disturbance block 312 is disposed on the suction side 240 of the wind turbine blade 200. Alternatively, in each set of inclined flow disturbance blocks 310, the first inclined flow disturbance block 311 is disposed on the suction side 240 of the wind turbine blade 200, and the second inclined flow disturbance block 312 is disposed on the pressure side 230 of the wind turbine blade 200. The spiral arrangement in this embodiment can prevent the wind turbine blade 200 from generating in-phase vortex-induced forces, thereby avoiding vibrational excitation.

Referring to FIGS. 11 to 14, in some embodiments, first inclined flow disturbance blocks 311 of the plurality of sets of inclined flow disturbance blocks 310 are all arranged on the pressure side 230 or the suction side 240 of the wind turbine blade 200. It shall be understood that in the plurality of sets of inclined flow disturbance blocks 310, the first inclined flow disturbance blocks 311 are all arranged on the pressure side 230 of the wind turbine blade 200, and the second inclined flow disturbance blocks 312 are all arranged on the suction side 240 of the wind turbine blade 200. In the plurality of sets of inclined flow disturbance blocks 310, the first inclined flow disturbance blocks 311 are all arranged on the suction side 240 of the wind turbine blade 200, and the second inclined flow disturbance blocks 312 are all arranged on the pressure side 230 of the wind turbine blade 200.

Referring to FIGS. 11 to 14, in some embodiments, in each set of spanwise flow disturbance strips 320, the first spanwise flow disturbance strip 321 is disposed on the pressure side 230 or the suction side 240 of the wind turbine blade 200, and the second spanwise flow disturbance strip 322 is disposed on a side opposite to the first spanwise flow disturbance strip 321. Here, if the first spanwise flow disturbance strip 321 is disposed on the pressure side 230 of the wind turbine blade 200, the second spanwise flow disturbance strip 322 is disposed on the suction side 240 of the wind turbine blade 200. Alternatively, if the first spanwise flow disturbance strip 321 is disposed on the suction side 240 of the wind turbine blade 200, the second spanwise flow disturbance strip 322 is disposed on the pressure side 230 of the wind turbine blade 200.

In some embodiments, two sets of first spanwise flow disturbance strips 321 of two sets of adjacent spanwise flow disturbance strips 320 are arranged on the pressure side 230 and the suction side 240 of the wind turbine blade 200, respectively. For example, if the first spanwise flow disturbance strip 321 of one of the two sets of adjacent spanwise flow disturbance strips 320 is disposed on the pressure side 230 of the wind turbine blade 200, the first spanwise flow disturbance strip 321 of the other of the two sets of adjacent spanwise flow disturbance strips 320 is disposed on the suction side 240 of the wind turbine blade 200. Furthermore, if the second spanwise flow disturbance strip 322 of the one of the two sets of adjacent spanwise flow disturbance strips two sets of adjacent spanwise flow disturbance strips 320 is disposed on the pressure side 230 of the wind turbine blade 200, the second spanwise flow disturbance strip 322 of the other of the two sets of adjacent spanwise flow disturbance strips 320 is disposed on the suction side 240 of the wind turbine blade 200. In each of the at least one set of spanwise flow disturbance strips 320, one of the first spanwise flow disturbance strip 321 and the second spanwise flow disturbance strip 322 is disposed on the pressure side 230 of the wind turbine blade 200, and the other of the first spanwise flow disturbance strip 321 and the second spanwise flow disturbance strip 322 is disposed on the suction side 240 of the wind turbine blade 200.

Referring to FIGS. 12 and 13, in some embodiments, the first spanwise flow disturbance strip 321 and the second spanwise flow disturbance strip 322 in each set of spanwise flow disturbance strips 320 are extended out of the wind turbine blade 200. Referring to FIGS. 11 and 14, in another embodiment, outermost sides/edges of the first spanwise flow disturbance strip 321 and the second spanwise flow disturbance strip 322 in each set of spanwise flow disturbance strips 320 are substantially flush with the wind turbine blade 200, that is, the first spanwise flow disturbance strip 321 and the second spanwise flow disturbance strip 322 do not protrude from the wind turbine blade 200, and can be specifically designed according to design requirements.

In this embodiment, the sets of inclined flow disturbance blocks 310 and the sets of spanwise flow disturbance strips 320 may be arranged in the determined final vortex-induced resonance/vibration region, the sets of inclined flow disturbance blocks 310 may be installed every 3 meters at the leading edge 210 and the trailing edge 220 of the wind turbine blade 200 using elastic straps, and the sets of spanwise flow disturbance strips 320 may be closely arranged between the sets of inclined flow disturbance blocks 310.

FIGS. 11 to 14 illustrate four arrangements of the sets of inclined flow disturbance blocks 310 and the sets of spanwise flow disturbance strips 320. In other embodiments, the sets of inclined flow disturbance blocks 310 and the sets of spanwise flow disturbance strips 320 may also be arranged according to specific design requirements.

In embodiments of the disclosure, the inclined flow disturbance blocks and the spanwise flow disturbance strips are arranged in the vortex-induced resonance/vibration region of the wind turbine blade 200, the airflow passing through the wind turbine blade 200 is subjected to significant irregular disturbances, thus effectively suppressing vortex-induced vibrations of the wind turbine blade. In addition, the vortex-induced resonance region defines the arrangement range of the anti-vortex device 300, thus increasing the effectiveness of the anti-vortex device 300, reducing the unnecessary arrangement of the anti-vortex device 300, reducing the influence on the paint surface of the wind turbine blade 200 and the disassembly workload of the anti-vortex device 300.

Therefore, those skilled in the art will recognize that while various exemplary embodiments of the present disclosure have been illustrated and described in detail herein, many other variations or modifications consistent with the principles of the present disclosure may be directly determined or deduced from the disclosure of the present disclosure without departing from the spirit and scope of the disclosure. Accordingly, the scope of the present disclosure shall be understood and deemed to cover all such other variations or modifications.

What is claimed is:

1. An anti-vortex device for preventing vortex-induced resonance in a wind turbine blade, comprising:

a plurality of sets of inclined flow disturbance blocks, wherein each set of the plurality of sets of inclined flow disturbance blocks includes at least one first inclined flow disturbance block disposed at a leading edge of the wind turbine blade and at least one second inclined flow disturbance block disposed at a trailing edge of the wind turbine blade, and wherein the at least one first inclined flow disturbance block and the at least one second inclined flow disturbance block are inclined and extend out of the wind turbine blade toward a blade tip direction or a blade root direction opposite to the blade tip direction; and a plurality of sets of spanwise flow disturbance strips, wherein each set of the plurality of sets of spanwise flow disturbance strips includes at least one first spanwise flow disturbance strip disposed at the leading edge of the wind turbine blade and at least one second spanwise flow disturbance strip disposed at the trailing edge of the wind turbine blade, and wherein the at least one first spanwise flow disturbance strip extends along an extension direction of the leading edge of the wind turbine blade, and the at least one second spanwise flow disturbance strip extends along an extension direction of the trailing edge of the wind turbine blade;

wherein the at least one first inclined flow disturbance block and the at least one second inclined flow disturbance block in each set of the plurality of sets of inclined flow disturbance blocks are both inclined toward a blade tip direction of the wind turbine blade or are both inclined toward a blade root direction of the wind turbine blade;

wherein the plurality of sets of inclined flow disturbance blocks include a first set of inclined flow disturbance blocks and an adjacent second set of inclined flow disturbance blocks, the at least one first inclined flow disturbance block of the first set of inclined flow disturbance blocks is inclined toward the blade root direction of the wind turbine blade and the at least one first inclined flow disturbance block of the second set of inclined flow disturbance blocks is inclined toward the blade tip direction of the wind turbine blade, the at least one second inclined flow disturbance block of the first set of inclined flow disturbance blocks is inclined toward the blade root direction of the wind turbine blade and the at least one second inclined flow disturbance block of the second set of inclined flow disturbance blocks is inclined toward the blade tip direction of the wind turbine blade.

2. The anti-vortex device of claim 1, wherein the plurality of sets of inclined flow disturbance blocks and the plurality of sets of spanwise flow disturbance strips are staggered in the extension direction of the wind turbine blade.

3. The anti-vortex device of claim 2, wherein in each set of the plurality of sets of spanwise flow disturbance strips, the at least one first spanwise flow disturbance strip is disposed on a pressure side or a suction side of the wind turbine blade, and the at least one second spanwise flow disturbance strip is disposed on a side opposite to the at least one first spanwise flow disturbance strip.

4. The anti-vortex device of claim 3, wherein the plurality of sets of spanwise flow disturbance strips include a first set of spanwise flow disturbance strips and an adjacent second set of spanwise flow disturbance strips, the at least one first spanwise flow disturbance strip of the first set of spanwise flow disturbance strips is disposed on the pressure side and the at least one first spanwise flow disturbance strip of the second set of spanwise flow disturbance strips is disposed on the suction side of the wind turbine blade.

5. The anti-vortex device of claim 1, wherein in each set of the plurality of sets of inclined flow disturbance blocks, the at least one first inclined flow disturbance block is disposed on a pressure side or a suction side of the wind turbine blade, and the at least one second inclined flow disturbance block is disposed on a side opposite to the at least one first inclined flow disturbance block.

6. The anti-vortex device of claim 5, wherein in the plurality of sets of inclined flow disturbance blocks, first inclined flow disturbance blocks are arranged on the pressure side or the suction side of the wind turbine blade.

* * * * *